(12) United States Patent
Hodgson et al.

(10) Patent No.: US 8,820,053 B2
(45) Date of Patent: Sep. 2, 2014

(54) METHOD FOR OPERATING A DELIVERY DEVICE FOR A REDUCING AGENT AND MOTOR VEHICLE HAVING A DELIVERY DEVICE

(75) Inventors: Jan Hodgson, Troisdorf (DE); Peter Bauer, Siegburg (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 273 days.

(21) Appl. No.: 13/482,093

(22) Filed: May 29, 2012

(65) Prior Publication Data

US 2012/0260632 A1 Oct. 18, 2012

Related U.S. Application Data

(63) Continuation of application No. PCT/EP2010/066851, filed on Nov. 5, 2010.

(30) Foreign Application Priority Data

Nov. 27, 2009 (DE) .......................... 10 2009 056 181

(51) Int. Cl.
*F01N 3/20* (2006.01)
*F01N 3/24* (2006.01)

(52) U.S. Cl.
USPC ................. 60/286; 60/274; 60/295; 222/72; 137/73

(58) Field of Classification Search
USPC .................. 60/274, 286, 295; 222/72; 137/73
See application file for complete search history.

(56) References Cited

U.S. PATENT DOCUMENTS

| 5,823,747 A * | 10/1998 | Ciavarini et al. .............. 417/216 |
| 8,266,892 B2 * | 9/2012 | Zapf et al. ........................ 60/286 |
| 2002/0182113 A1 * | 12/2002 | Shvets et al. .................... 422/99 |
| 2011/0239625 A1 | 10/2011 | Fokkelman et al. |
| 2012/0047880 A1 | 3/2012 | Leonard et al. |

FOREIGN PATENT DOCUMENTS

| DE | 10 2007 030 555 A1 | 1/2009 |
| WO | 2008/031421 A1 | 3/2008 |
| WO | 2010/066564 A1 | 6/2010 |
| WO | 2010/119116 A2 | 10/2010 |

OTHER PUBLICATIONS
International Search Report of PCT/EP2010/066851, Dated Feb. 22, 2011.

* cited by examiner

*Primary Examiner* — Thomas Denion
*Assistant Examiner* — Brandon Lee
(74) *Attorney, Agent, or Firm* — Laurence A. Greenberg; Werner H. Stemer; Ralph E. Locher

(57) ABSTRACT

A method for operating a reducing agent delivery device having a liquid reducing agent tank, an injector dispensing reducing agent into an exhaust treatment device, an internal combustion engine and a reducing agent line from tank to injector, includes conveying the reducing agent from tank to injector with a pump and providing a pressure sensor in the line. The method includes, repeatedly: determining and providing supply pressure for the injector in the delivery device with the pump, calculating an injector opening time from a determined injection volume and supply pressure and opening the injector at the calculated injector opening time. A venting procedure at a point in time includes: determining an increase of a pressure conveying volume characteristic in the delivery device, calculating an air bubble volume by comparing the increase to a target increase, and conveying a conveying volume through the injector. A motor vehicle is also provided.

8 Claims, 2 Drawing Sheets

METHOD FOR OPERATING A DELIVERY DEVICE FOR A REDUCING AGENT AND MOTOR VEHICLE HAVING A DELIVERY DEVICE

CROSS-REFERENCE TO RELATED APPLICATION

This is a continuation, under 35 U.S.C. §120, of copending International Application No. PCT/EP2010/066851, filed Nov. 5, 2010, which designated the United States; this application also claims the priority, under 35 U.S.C. §119, of German Patent Application DE 10 2009 056 181.1, filed Nov. 27, 2009; the prior applications are herewith incorporated by reference in their entirety.

BACKGROUND OF THE INVENTION

Field of the Invention

The invention relates to a method for operating a delivery device for a reducing agent. In particular, the invention relates to a method for operating a delivery device for a reducing agent without a return line. The invention also relates to a motor vehicle having a delivery device.

The exhaust gas from internal combustion engines generally contains substances, the emission of which into the environment is unwanted. In many countries, for example, the exhaust gas from internal combustion engines can only contain nitrogen oxide compounds (NOx) up to a certain limit. Apart from measures within the engine, through which it is possible to reduce the emissions of nitrogen oxide compounds by choosing the most suitable operating point for the internal combustion engine, aftertreatment methods, through which a further reduction in nitrogen oxide emissions is possible, have become established.

One possibility for achieving a further reduction in nitrogen oxide emissions is "selective catalytic reduction" (SCR). In that case, the nitrogen oxides are reduced selectively to molecular nitrogen ($N_2$) using a reducing agent. One possible reducing agent is ammonia ($NH_3$). However, ammonia is often not stored in the form of ammonia but, instead, an ammonia precursor that can be converted into ammonia when required is stored. The term "reducing agent precursor" is used therefor. One important potential reducing agent precursor which can be used in motor vehicles is urea (($NH_2$)$_2$CO). Urea is preferably stored in the form of an aqueous urea/water solution. Urea and, in particular, an aqueous urea solution are harmless to health and are simple to distribute, store and meter in. An aqueous urea solution of that type with a urea content of 32.5% is marketed under the trade name "AdBlue."

An aqueous urea solution is usually carried in a tank system in the motor vehicle and is metered into the exhaust system in portions through the use of an injection system including a pump and an injector.

Delivery devices known from the prior art for delivering reducing agent from a tank system to an exhaust system have a delivery line from the tank system toward the exhaust system. In addition, a return line is provided, branching off from the delivery line in a region upstream of a pump and running back into the tank. On one hand, the reason for the return line is to enable circulation of reducing agent through the use of such a return line, thereby enabling the delivery device to be filled efficiently with reducing agent and allowing air bubbles to be conveyed out of the delivery device. On the other hand, pressure relief in the delivery line can be accomplished through the use of the return line when reducing agent freezes.

Due to new, more flexible materials for the delivery line, a return line provided because of the ice pressure upon freezing is no longer absolutely required. However, there is still a need for a return line to remove air by circulation of reducing agent, thereby enabling an air bubble to be conveyed out of the delivery device. As a rule, it is important to avoid an air bubble in the delivery device so as to ensure that there is reducing agent available at the injector for supplying reducing agent to an exhaust gas treatment device.

SUMMARY OF THE INVENTION

It is accordingly an object of the invention to provide a method for operating a delivery device for a reducing agent and a motor vehicle having a delivery device, which overcome the hereinafore-mentioned disadvantages and mitigate the highlighted technical problems of the heretofore-known devices and vehicles of this general type. In particular, the intention is to disclose a method by which a delivery device can be operated without a return line in such a way that an appropriate supply of reducing agent to an exhaust gas treatment device can be ensured.

With the foregoing and other objects in view there is provided, in accordance with the invention, a method for operating a delivery device for a reducing agent having a tank for a liquid reducing agent, an injector for supplying the liquid reducing agent to an exhaust gas treatment device, an internal combustion engine and a reducing agent line which runs from the tank to the injector and in which at least one pump for delivering reducing agent in a delivery direction from the tank to the injector and at least one pressure sensor are disposed. The method comprises at least the following steps:
  a) determining and providing a supply pressure for the injector in the delivery device which is appropriate and achievable with the pump;
  b) calculating an injector opening time from a defined injection quantity and the achievable supply pressure; and
  c) opening the injector for the calculated injector opening time, wherein, at a predefined point in time, an air removal procedure is carried out, including at least the following steps:
    i) determining an actual slope of a pressure/delivery volume characteristic of the delivery device;
    ii) calculating an air bubble volume by comparing the determined slope to a target slope; and
    iii) delivering a delivery volume through the injector if the air bubble volume calculated in step ii) is greater than a maximum permissible air bubble volume.

Within the context of the method according to the invention, "reducing agent" refers, on one hand, to a "liquid" reducing agent (especially ammonia) and/or a (liquid) reducing agent precursor (especially urea or an aqueous urea solution).

The method according to the invention is based on the consideration that an air bubble contained in the delivery device can only be discharged through the injector in the case of a delivery device which does not have a return line and in which delivery of reducing agent is possible in only one direction from the tank to the injector. In this way, the air bubble passes into the exhaust system of an internal combustion engine.

The fact that a delivery device of this kind is operated in only one direction, with a delivery direction from the tank to the injector, is due to the fact, for example, that the preferred pumps generally have self-opening and closing valves, which allow only a predetermined pump delivery direction.

With the method according to the invention, the aim is, on one hand, to convey an air bubble out of the delivery device through the injector and, on the other hand, to ensure the minimum possible loss of reducing agent during this process. However, a certain level of reducing agent loss into the exhaust gas treatment device is tolerated within the context of the method according to the invention.

The method according to the invention includes a "regular operating mode," including method steps a) to c), and an occasional air removal procedure including method steps i) to iii). The air removal procedure is often associated with a loss of reducing agent from the delivery device to the exhaust system, and therefore the air removal procedure should be carried out only when an air bubble that disrupts the regular operating mode is identified. The regular operating mode of the delivery device according to steps a) to c) is carried out in such a way that, at least under certain circumstances, it can be carried out without initiating the air removal procedure, even when there is an air bubble in the delivery device.

Fundamentally, it can be stated that the regular operating mode in steps a) to c) can be maintained without air removal if there is an air bubble in the intake zone of the delivery device and/or in the region of the pump of the delivery device. The air removal procedure according to steps i) to iii) need only be carried out if there is an air bubble in the delivery device downstream of the pump, between the pump and the injector, because then there is a risk that there will be no reducing agent available at the injector.

Method steps a) to c) and i) to iii) will be explained in greater detail below. In step a), an achievable supply pressure is determined and made available for the injector by the pump. A pump operating in a pulsed manner in which there is an air bubble can only achieve a reduced supply pressure relative to the normal supply pressure. This is due to the ratio of the maximum volume within the pump chamber of the pump to the minimum volume within the pump chamber of the pump. This is because of the fact that, when there is an air bubble in the pump, the air bubble is compressed first before fluid is actually delivered by the pump. When the air bubble exceeds a certain size, the pump is no longer capable of producing a certain pressure. The capacity of the pump to provide a predefined supply pressure is therefore checked in step a). The supply pressure is defined so that the pump can achieve it and that, at the same time, the pump also still has a significant delivery capacity. Typically, the appropriate supply pressure is defined as 10%, preferably 20% and particularly preferably 50% below the maximum achievable delivery pressure of the pump. In this way, it is possible to ensure sufficiently efficient provision of pressurized reducing agent with the delivery device without the pump producing only waste heat due to the compression of an air bubble.

This is followed, in step b), by the calculation of an injector opening time from a defined injection quantity and the appropriate or achievable supply pressure. If appropriate, the available opening voltage for electrical activation of the injector and/or the temperature of the system and/or of the reducing agent can additionally be allowed for in step b). The available (electrical) opening voltage determines how far and/or how quickly the injector opens and therefore has an effect on the size of the quantity of reducing agent supplied. The temperature of the system and/or of the reducing agent has an effect, for example, on the viscosity and/or the volume of the reducing agent, and the temperature therefore also has an effect on the quantity of reducing agent supplied. As a rule, the injector opening time determines the quantity of reducing agent supplied to the exhaust gas treatment device by the injector. The relationship between the quantity of reducing agent supplied and the opening time of the injector varies in a manner dependent, inter alia, on the supply pressure prevailing behind the injector in the delivery device. For this reason, the available supply pressure determined in step a) must be taken into account in the calculation of an appropriate injector opening time.

In step c), the injector is then opened for the calculated injector opening time in order to supply the required quantity of injected reducing agent to the exhaust gas treatment device.

At a predefined point in time, an air removal procedure, including steps i) to iii), is carried out. There can be an appropriate predefined point in time for each occurrence of method steps a) to c) of the regular operating mode, for example.

For this purpose, the slope of a pressure/delivery volume characteristic is first of all determined in step i). As a rule, a delivery device has a certain elasticity, which is due to the elasticity of the lines and of the individual components. For this reason, there is a certain increase in pressure in a delivery device when the pump delivers a certain volume of reducing agent with the injector closed. If there is an air bubble in the delivery device between the pump and the injector, it acts like an elastic component. For this reason, the increase in a pressure/delivery volume characteristic of the delivery device is reduced if there is an air bubble between the pump and the injector in the delivery device. It is precisely this slope, which depends on the air bubble, which is determined in step i). In this case, the determination of a slope of a pressure/delivery volume characteristic is only a simplification of the actual situation. With regard to the relationship between the pressure and the delivery volume, there are, in addition to the size of an air bubble, other sources of cross-interference, which should likewise advantageously be known so that the size of any air bubble can be determined with particularly high precision. Among these influences is the opening time of the injectors, for example. Due to the viscosity and volume of the reducing agent, which is affected by temperature, the delivery volume may be greater in the case of long opening times than in the case of short opening times for the same pressure and the same air bubble volume. Another advantageous possibility (if appropriate instead of a slope of a pressure/volume characteristic) is therefore to determine a gradient in a multi-dimensional characteristic map which represents the relationships between the air bubble volume, the pressure and the delivery volume and any sources of cross-interference which occur. In step ii), a calculation of the air bubble volume is then carried out by comparing the actual slope determined in step i) and the target, nominal or desired slope of the pressure/delivery volume characteristic of the delivery device, which results from the elasticity of the lines of the delivery device. Based on this air bubble volume, a delivery volume is then specified, and this is delivered by the injector as part of the air removal procedure to ensure that the air bubble is conveyed completely out of the delivery device and/or is at least significantly reduced in size. This delivery volume is delivered by the injector in step iii). If an air bubble volume which cannot significantly disrupt the regular operating mode according to steps a) to c) is calculated in step ii), there is no need for any delivery volume to be delivered by the injector in step iii). There is thus also no need for any delivery by the injector and for opening of the injector if the air bubble volume calculated in step ii) is not greater than a maximum permissible air bubble volume.

With regard to the method according to the invention, it should also be pointed out in general that although unwanted delivery of reducing agent into the exhaust gas treatment device during step iii) is disadvantageous because it gives rise to costs for this reducing agent, it has no effect on the quality of exhaust gas treatment. As a rule, it is also impossible for reducing agent to escape from the exhaust gas treatment device because exhaust gas treatment devices have a so-called "blocking catalytic converter" to prevent reducing agent from escaping. That catalytic converter closes off the exhaust gas treatment system downstream of the other exhaust gas treatment components in the direction of flow of the exhaust gas and catalyzes excess reducing agent, thus eliminating the possibility that reducing agent will escape from the exhaust system of an internal combustion engine.

In contrast, the provision of too little reducing agent to an exhaust gas treatment device in the regular operating mode during steps a) to c) is problematic because that enables pollutants which have to be reduced according to current exhaust standards to escape into the environment.

In accordance with another particularly advantageous mode of the method of the invention, the at least one pump is a pump which operates in a pulsed manner, and an air bubble in the pump is detected in step a) by using at least one pressure sensor to detect and evaluate at least one pressure signal that can be associated with a single pump stroke.

Due to the pulsed (intermittent or stroke-type) delivery movement of a pump which operates in a pulsed manner, the delivery stroke produces a pressure pulse at regular intervals, which propagates through the delivery device, starting from the pump. This pressure pulse can be detected and recorded by a downstream pressure sensor in the delivery device. As a result, measurement of the pressure signal at the pressure sensor should be significantly more precise and should take place at shorter intervals of time than is necessary for the purpose of detecting the prevailing supply pressure. However, it is possible through the use of such evaluation of a pressure pulse to detect whether there is an air bubble in the pump and how large it is. This is due to the fact that the air bubble acts like an elastic volume in the pump and this is already enough to prevent the formation of a sharply rising pressure pulse in the pump. In other words, this allows a distinction to be made at the pressure sensor between an air bubble in the pump and an air bubble which is upstream or downstream of the pump in a reducing agent line. The pressure rise and/or the pressure drop due to the pressure pulse are all the steeper, for example, the smaller that an air bubble contained in the pump becomes. This can be used to determine the size of an air bubble in step a).

In the case of pumps which operate in a pulsed manner, the volume of a pump chamber increases and decreases at regular intervals. The pump chamber has an inlet for the delivery fluid and an outlet separated from the inlet. The inlet and the outlet are each provided with a valve. These valves determine the delivery direction through the pump because the delivery fluid can only enter the pump chamber through the inlet and the delivery fluid can only leave the pump chamber through the outlet. When the volume of the pump chamber decreases, delivery fluid thus emerges from the outlet. On the other hand, the delivery fluid is drawn in through the inlet when the volume of the pump chamber increases.

Frequently used pumps which operate in a pulsed manner are piston pumps or diaphragm pumps, for example. In the case of piston pumps, the pump chamber or a wall of the pump chamber is formed in part by a pump piston. When the pump piston is moved, the volume of the pump chamber changes. The pump piston is often driven electromechanically. In this case, an electric coil produces a magnetic force which deflects the pump piston. In the case of diaphragm pumps, the pump chamber or a wall of the pump chamber is formed in part by a moving diaphragm. The diaphragm can move into the pump chamber and change the volume in the process. Various concepts are known for moving the diaphragm. In the case of "piston-type diaphragm pumps," the movement of a piston is transmitted to the diaphragm through the use of an additional working fluid. In this case, the piston can be driven exactly in the same way as in a normal piston pump. In the case of mechanically deflected diaphragm pumps, the diaphragm is driven directly by mechanical measures. This can be accomplished, for example, through the use of an eccentric, which engages on the diaphragm through a connecting rod and moves the diaphragm, causing the pump chamber to increase and decrease in size at regular intervals.

In accordance with a further advantageous mode of the method of the invention, steps b) and c) are repeated more frequently than step a). An air bubble in the pump, which is detected in step a) of the method, cannot normally be reduced very quickly. This is due to the fact that the air bubble is at least partially retained due to capillary forces in the pump chamber. It can only be reduced continuously over a relatively long period of time. However, step a) requires computing capacity, and it therefore makes sense to carry out step a) less often than steps b) and c), which are necessary for the regular operating mode and for supplying reducing agent to the exhaust gas treatment device. For example, step a) can be carried out at the maximum every fifth time that steps b) and c) are carried out.

In accordance with an added advantageous mode of the method of the invention, the pump is a pump which operates in a pulsed manner and, at least in step iii), is operated with a maximum delivery stroke or at a reduced frequency relative to the regular operating mode. In the case of a pump which operates in a pulsed manner, delivering air is generally problematic, as has already been explained. At a maximum delivery stroke and low delivery frequencies, the conditions for air delivery are still ideal. For this reason, it is worthwhile, for step iii), to choose an operating mode of the pump in which it is precisely the maximum delivery stroke which is utilized and possibly, at the same time, operation takes place at a reduced frequency.

In accordance with an additional advantageous mode of the method of the invention, steps i) to iii) are repeated several times in succession as part of the air removal procedure until the actual slope determined in step i) and the target slope are approximately equal in step ii). In this way, it is possible to ensure that an air bubble has been conveyed reliably out of the delivery device and that reducing agent is available at the injector upon completion of the air removal procedure.

In accordance with yet another advantageous mode of the method of the invention, the delivery volume delivered in step iii) is less than the air bubble volume calculated in step ii). The delivery volume delivered in step iii) can be a maximum of 80%, in particular a maximum of 90% and, particularly preferably, a maximum of 95% of the calculated air bubble volume. In this way, it is possible to ensure that the loss of reducing agent due to the air removal procedure is not excessive. If, in addition, steps i) to iii) of the air removal procedure are repeated several times in succession, the actual slope of a pressure/delivery volume characteristic determined in step i) can be approximated to the (theoretical) target slope of a pressure/delivery volume characteristic, thus ensuring, on one hand, that the air bubble is conveyed completely out of the delivery device and, at the same time, that a minimum loss of reducing agent occurs.

In accordance with yet a further advantageous mode of the method of the invention, the air removal procedure is carried out through the use of steps i) to iii) if at least one of the following states was present immediately prior to this:

initial startup of the delivery device;
  filling of the tank of the delivery device;
  a motor vehicle is traveling at an oblique angle while a filling level in the tank is below a threshold value;
  changing of a reducing agent filter in the delivery device; and
  restarting after a freezing process.

Common to all of these states listed herein is the fact that there is the risk that the intake pipe of the delivery device in the tank may emerge from the reducing agent, thereby allowing air to enter the delivery device. It is therefore worthwhile to initiate method steps i) to iii) automatically if one of these states has been present previously. This can take place at predetermined points in time as an alternative or in addition to the triggering of the air removal procedure.

Initial startup of the delivery device is the state when the delivery direction is used to deliver reducing agent for the first time. Since the refilling process can likewise result in pressure fluctuations and opening of the system, the air removal procedure is also helpful after (each) filling of the tank. This applies in corresponding fashion to the repair or replacement of components of the delivery device, e.g. when changing a reducing agent filter. The risk of new air bubbles in the system is also increased in the case where the delivery device departs from a (predetermined) position, e.g. in the case of an upward-sloping or downward-sloping position (of the kind which may arise when a motor vehicle is traveling at an oblique angle), especially if the tank already contains a relatively large amount of air, and carrying out the air removal procedure may be worthwhile. In addition, the risk may be increased, even in the case of a closed system, if changes in the state of aggregation of the reducing agent occur (at various points in the delivery device), e.g. following restarting of the delivery device after the reducing agent therein has been at least partially frozen and has consequently thawed out again.

With the objects of the invention in view, there is concomitantly provided a motor vehicle, comprising an internal combustion engine, an exhaust gas treatment device and a delivery device for reducing agent. The delivery device is configured to supply a reducing agent toward the exhaust gas treatment device and has a controller, which is set up to carry out the method according to the invention.

The method according to the invention can also be employed in other (stationary) machines which produce exhaust gases. Among the examples which may be mentioned herein are construction machines or generators. For this purpose, the delivery device can also include an injector, through the use of which the reducing agent can be added in liquid form to an exhaust line ahead of an exhaust gas treatment device (e.g. an SCR catalytic converter and/or a hydrolysis-type catalytic converter and/or a (catalytically coated) particle separator and/or a mixing element). This controller may be present either in a separate control device or within the engine controller of the motor vehicle, and the latter may also be connected to suitable sensors or the like, if appropriate. For this purpose, the method can be implemented in appropriate software.

Other features which are considered as characteristic for the invention are set forth in the appended claims, noting that the features presented individually in the claims can be combined in any technologically meaningful way and can be supplemented by explanatory material from the description, giving rise to additional variant embodiments of the invention.

Although the invention is illustrated and described herein as embodied in a method for operating a delivery device for a reducing agent and a motor vehicle having a delivery device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
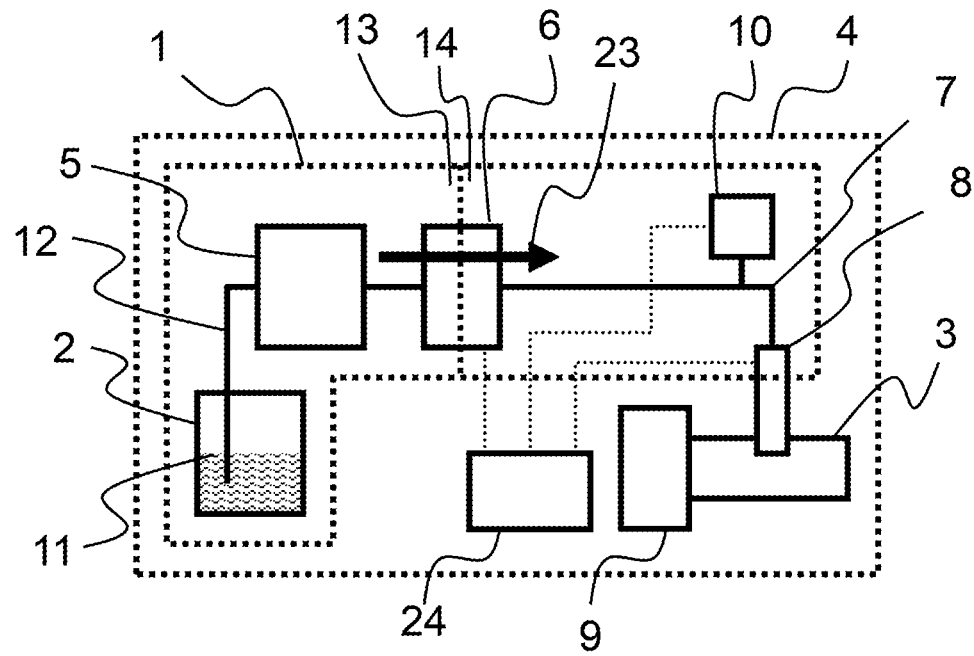
FIG. 1 is a diagrammatic, side-elevational view of a motor vehicle having a delivery device according to the invention.

Referring now to the figures of the drawings in detail and first, particularly, to FIG. 1 thereof, there is seen a motor vehicle 4 having an internal combustion engine 9 with an exhaust gas treatment device 3 and a delivery device 1 according to the invention. The delivery device 1 according to the invention delivers reducing agent from a tank 2, through a reducing agent line 7 and an injector 8, to the exhaust gas treatment device 3 in a delivery direction 23. Delivery from the tank 2 is accomplished through an intake pipe 12. The intake pipe 12 is disposed in such a way that, at normal filling levels 11 in the tank 2, it is disposed within the reducing agent. In the delivery device 1 according to the invention, a reducing agent filter 5, a pump 6 and a pressure sensor 10 are disposed along the reducing agent line 7 in series in the delivery direction 23. The delivery device 1 can be divided at the pump 6 into an (upstream) suction zone 13 and a (downstream) pressure zone 14. There can be an air bubble either in the suction zone 13, in the pressure zone 14 or in the pump 6. The delivery device 1 is controlled by a controller 24. The controller 24 is configured for carrying out the method according to the invention. The method according to the invention can be implemented in the form of software stored in the controller 24. The controller 24 is connected at least to the pump 6, the pressure sensor 10 and the injector 8 in order to obtain information from these components on the state of the delivery device 1 and, if appropriate, to control these components.

Figure 2:
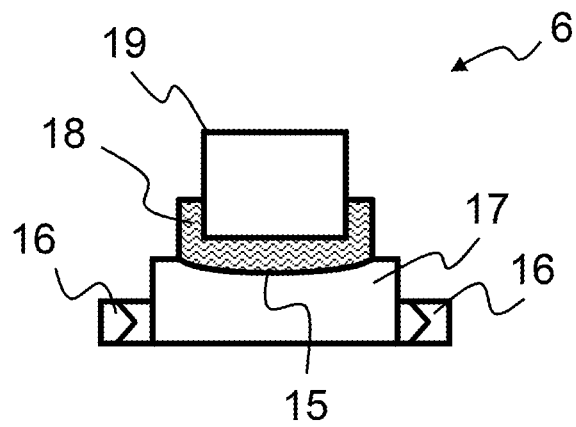
FIG. 2 is an enlarged, side-elevational view of a pump which operates in a pulsed manner.

FIG. 2 shows a pump 6 of the type which may be used in such a delivery device 1. A pump 6 of this kind has a pump chamber 17, which is driven by a drive 19 that is normally embodied as a reciprocating piston. In order to transfer the power of the drive 19 to the pump chamber 17, a transfer medium 18 in the form of a transmission fluid and a diaphragm 15 are normally provided. Through the use of this construction, it is possible to avoid direct contact between the reducing agent contained in the pump chamber 17 and the drive 19. This is advantageous because, in particular, reducing agent is very corrosive and could damage the drive 19. In order to define the delivery direction of the pump 6, the pump has valves 16 which are disposed upstream and downstream of the pump chamber 17 in the direction of flow.

Figure 3:
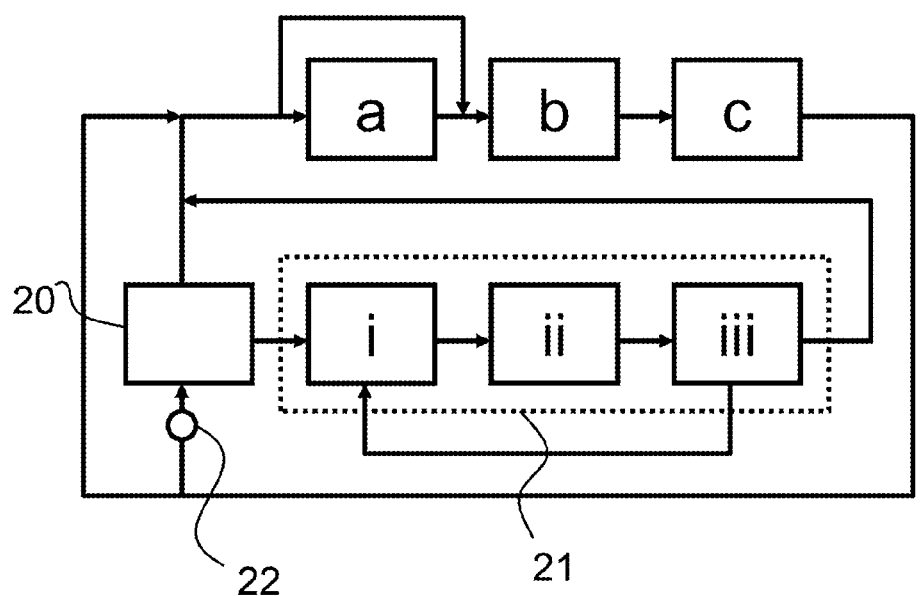
FIG. 3 is a flow diagram of a method according to the invention.

FIG. 3 illustrates the method according to the invention in a diagram including method steps a), b) and c) and i), ii) and iii). Typically, the method begins at a method start 22. However, the method can also begin at any other point of the diagram. In a regular operating mode, (only) method steps a), b) and c) are normally carried out. Method step a) may also be bypassed in order to reduce the effort required for the method according to the invention. If the presence of an air bubble between the pump and the injector in the delivery device is detected in an event check 20, an air removal procedure 21 including method steps i), ii) and iii) can be initiated. As an option, the air removal procedure 21 can be repeated several times.

Through the use of the method according to the invention, it is possible to construct a device for supplying reducing agent to an exhaust gas treatment device of an internal combustion engine in a particularly economical and simple manner. This far outweighs the disadvantages resulting from an additional loss of reducing agent in carrying out the method according to the invention and, in particular, during the air removal procedure. The states which necessitate air removal from a delivery device for a reducing agent occur seldom and the occurrence thereof can be further reduced by additional measures. Moreover, delivery devices typically have very small total volumes. The quantities of reducing agent which are lost due to air removal are limited by the total volumes. If a quantity of reducing agent corresponding to the total volume of the delivery device is delivered by a delivery device, this also ensures that there is no longer any reducing agent in the delivery device. This method can therefore be operated in such a way that the loss of reducing agent during air removal is no larger than the total volume of the delivery device.

Delivery devices for the method according to the invention in passenger vehicles advantageously have a total volume of less than 150 ml [milliliters] and indeed preferably less than 100 ml. This includes both the delivery unit itself, with the individual components, such as the intake pipe, the pump, the filter, the sensors and the valves, and the connecting line section up to and including the injector. This refers therefore to the entire volume filled with liquid reducing agent which does not belong to the tank or to the exhaust gas treatment device. From this perspective, delivery devices for the proposed method in trucks preferably have a total volume of less than 350 ml, preferably less than 300 ml. A large part of this volume is accounted for by the connecting line section from the components of the delivery unit to the injector. The length and hence the volume of this connecting line section depend on the position of the delivery unit in the motor vehicle and the distance between the delivery unit and the exhaust gas treatment device in the motor vehicle. The connecting line section is preferably less than 4 m [meters] long and has a through-flow diameter of less than 3.5 mm [millimeters].

Due to the limited volumes, the quantities of reducing agent which get into the exhaust gas during air removal are acceptable when balanced against the advantages explained and the simpler construction which are made possible by the method according to the invention.

The method according to the invention is also suitable for delivery devices which do not deliver the reducing agent directly into an exhaust gas treatment device but in which the reducing agent is initially delivered only into a mixing chamber. In this mixing chamber, the reducing agent is initially mixed with a gas, e.g. compressed air. The mixture of gas and reducing agent is then supplied to an exhaust gas treatment device. In such delivery devices, the connecting line section from the delivery unit to the injector into the mixing chamber can be made considerably shorter because the mixing chamber does not have to be disposed directly at the exhaust gas treatment device but instead an additional connecting line from the mixing chamber to the exhaust gas treatment device can be provided. In such delivery devices, it is therefore possible for the total volume to be less than 90 ml and indeed preferably less than 30 ml. By way of example, the total volume is between 5 ml and 25 ml. The mixing chamber and the line from the mixing chamber to the exhaust gas treatment device are not included in this case.

The invention claimed is:

1. A method for operating a delivery device for a reducing agent, the method comprising the following steps:
providing the delivery device with a tank for a liquid reducing agent, an injector for supplying the liquid reducing agent to an exhaust gas treatment device of an internal combustion engine, and a reducing agent line running from the tank to the injector and having at least one pump for delivering reducing agent in a delivery direction from the tank to the injector and at least one pressure sensor;
a) determining and providing an adequate and achievable supply pressure for the injector in the delivery device with the pump;
b) calculating an injector opening time from a defined injection quantity and the achievable supply pressure;
c) opening the injector for the calculated injector opening time; and
carrying out, at a predefined point in time, an air removal procedure including at least the following steps:
i) determining an actual slope of a pressure/delivery volume characteristic in the delivery device;
ii) calculating an air bubble volume by comparing the determined slope to a target slope; and
iii) delivering a delivery volume through the injector if the air bubble volume calculated in step ii) is greater than a maximum permissible air bubble volume.

2. The method according to claim 1, which further comprises:
operating the at least one pump in a pulsed manner; and
detecting an air bubble in the at least one pump in step a) by using the at least one pressure sensor to detect and evaluate at least one pressure signal to be associated with a single pump stroke.

3. The method according to claim 1, which further comprises repeating steps b) and c) more frequently than step a).

4. The method according to claim 1, which further comprises:
operating the at least one pump in a pulsed manner; and
at least in step iii), operating the at least one pump with a maximum delivery stroke or at a reduced frequency relative to a regular operation.

5. The method according to claim 1, which further comprises repeating steps i) to ii) several times in succession as part of the air removal procedure until the slope determined in step i) and a theoretical slope are approximately equal.

6. The method according to claim 1, which further comprises setting the delivery volume delivered in step iii) to be less than the air bubble volume calculated in step ii).

7. The method according to claim 1, which further comprises carrying out the air removal procedure using steps i) to iii) if at least one of the following states was present immediately prior to carrying out the air removal procedure:
initial startup of the delivery device;
filling of the tank of the delivery device;

a motor vehicle traveling at an oblique angle with a filling level in the tank below a threshold value;
changing of a reducing agent filter in the delivery device; and
restarting after a freezing process.

8. A motor vehicle, comprising:
an internal combustion engine;
an exhaust gas treatment device associated with said internal combustion engine;
a reducing agent delivery device configured to supply reducing agent to said exhaust gas treatment device; and
a controller connected to said delivery device and configured to carry out the method according to claim 1.

* * * * *